United States Patent
Bilhe et al.

(10) Patent No.: US 10,549,378 B2
(45) Date of Patent: Feb. 4, 2020

(54) METHOD FOR PRODUCING A NICKEL ALUMINIDE COATING ON A METAL SUBSTRATE, AND PART HAVING ONE SUCH COATING

(71) Applicant: Office National D'Etudes et de Recherches Aérospatiales, Châtillon (FR)

(72) Inventors: Pascal Bilhe, Saint Médard en Jalles (FR); Marie-Pierre Bacos, Antony (FR); Pierre Josso, Erquy (FR)

(73) Assignee: Office National D'Etudes et de Recherches Aérospatiales, Châtillon (FR)

( * ) Notice: Subject to any disclaimer, the term of this patent is extended or adjusted under 35 U.S.C. 154(b) by 463 days.

(21) Appl. No.: 14/388,821

(22) PCT Filed: Mar. 27, 2013

(86) PCT No.: PCT/FR2013/000081
§ 371 (c)(1),
(2) Date: Sep. 29, 2014

(87) PCT Pub. No.: WO2013/150189
PCT Pub. Date: Oct. 10, 2013

(65) Prior Publication Data
US 2015/0056467 A1    Feb. 26, 2015

(30) Foreign Application Priority Data
Apr. 2, 2012    (FR) .................................... 12 00978

(51) Int. Cl.
*B23K 20/02*    (2006.01)
*C23C 10/28*    (2006.01)
*B23K 20/24*    (2006.01)

(52) U.S. Cl.
CPC .............. *B23K 20/02* (2013.01); *B23K 20/24* (2013.01); *C23C 10/28* (2013.01); *Y10T 428/1275* (2015.01)

(58) Field of Classification Search
CPC ... C23C 30/00; C23C 30/005; C23C 2222/00; Y10T 428/1275
See application file for complete search history.

(56) References Cited

U.S. PATENT DOCUMENTS 5,650,235 A * 7/1997 McMordie .............. C23C 10/26
 428/610
5,954,895 A    9/1999 Dumez et al.
(Continued)

FOREIGN PATENT DOCUMENTS

FR    2780982    1/2000
FR    2838753    10/2003
(Continued)

OTHER PUBLICATIONS

"Glossary of Metallurgical and Metalworking Terms," Metals Handbook, ASM Handbooks Online, ASM International, 2002, pp. 1, 7, 257.*
(Continued)

*Primary Examiner* — Vanessa T. Luk
(74) *Attorney, Agent, or Firm* — Dority & Manning, P.A.

(57) ABSTRACT

The invention relates to a method for producing a nickel aluminide coating on a metal substrate. The method includes the following steps: a) coating the substrate with a nickel deposit; b) applying an aluminum sheet onto the nickel deposit from step a) so as to form an assembly made up of the substrate coated with the nickel deposit and the aluminum sheet; and c) subjecting said assembly to heat treatment at a temperature that is lower than the melting point of aluminum, and at a low pressure so as to induce a reaction between the aluminum and the nickel and thus form a
(Continued)

β-NiAl nickel aluminide layer mounted on a nickel layer. The invention is particularly of use for protecting the materials used in turbines of aircraft engines.

20 Claims, 2 Drawing Sheets (56) References Cited

U.S. PATENT DOCUMENTS

| | | | | |
|---|---|---|---|---|
| 6,066,405 | A | * | 5/2000 | Schaeffer ............... C22C 19/03 416/241 R |
| 6,893,737 | B2 | * | 5/2005 | Ackermann ............ C23C 18/10 427/374.1 |
| 6,998,151 | B2 | | 2/2006 | Grylls et al. |
| 7,160,582 | B2 | | 1/2007 | Girard et al. |
| 7,278,828 | B2 | * | 10/2007 | Steplewski ............. B23P 6/005 29/888.024 |
| 7,569,251 | B2 | * | 8/2009 | Saint-Ramond ........ C23C 14/00 427/255.32 |
| 7,749,614 | B2 | | 7/2010 | Hoffmann et al. |
| 8,591,992 | B2 | | 11/2013 | Bacos et al. |
| 2008/0263864 | A1 | * | 10/2008 | Foucher ................. B23P 6/007 29/889.1 |
| 2011/0117384 | A1 | * | 5/2011 | Biswas .................. C23C 10/48 428/678 |
| 2013/0330540 | A1 | | 12/2013 | Bacos et al. |
| 2014/0050940 | A1 | * | 2/2014 | Guedou ................. C23C 10/00 428/633 |

FOREIGN PATENT DOCUMENTS

| | | |
|---|---|---|
| JP | H04250995 | 9/1992 |
| JP | 2932700 B2 * | 8/1999 |
| WO | WO 2009/139833 A2 | 11/2009 |
| WO | WO 2009/139833 A3 | 11/2009 |
| WO | WO 2012146864 A1 * | 11/2012 ............. C23C 10/00 |

OTHER PUBLICATIONS

Abstract of French Patent—FR2838753, dated Oct. 24, 2003, 2 pages.

International Search Report for PCT/FR2013/000081 dated Jun. 20, 2013, 2 pages.

* cited by examiner

METHOD FOR PRODUCING A NICKEL ALUMINIDE COATING ON A METAL SUBSTRATE, AND PART HAVING ONE SUCH COATING

CROSS-REFERENCE TO RELATED APPLICATIONS

This application is the national stage entry of International Patent Application No. PCT/FR2013/000081 having a filing date of Mar. 27, 2013, which claims priority to and the benefit of French Patent Application No. 12/00978 filed in the French Intellectual Property Office on Apr. 2, 2012, the entire contents of which are incorporated herein by reference.

BACKGROUND OF THE INVENTION

The invention relates to a method for producing a nickel aluminide coating on a metal substrate, and to a part provided with such a coating.

The mechanical strength and oxidation resistance of materials used in the turbines of aircraft engines limit the performance of the engines. Recent prospective studies show that, for the turbine blades, for which the wall temperature currently reaches 1050-1100° C., the optimization of the compositions of the metal alloys used (nickel-based "superalloys") and of the production methods, the improvement of the internal cooling circuits of the components and the use of thermal insulation coatings will not allow the intended wall temperatures of approximately 1300° C. to be reached. One method envisaged for operating at such temperatures is the use of composite materials constituted by two highly refractory phases, one of which is a metal phase M (where M is an Nb base alloyed with numerous elements such as Si, Ti, Cr, Hf, Al, etc.), which confers upon the material sufficient toughness at ambient temperature, and the other is an intermetallic phase $M_5Si_3$, which provides the desired strength and creep resistance at high temperature. These materials are called "materials of type Nb—Si" or "alloys of type Nb—Si" hereinbelow.

However, an obstacle to their development is their low oxidation resistance at high temperature, despite a large number of "favourable" elements being added to their initial composition (Si, Cr, B and Al). In fact, when such a material is subjected to the operating conditions of gas turbines, it is destroyed by oxidation within a period of between several minutes and about ten hours, depending on the grade used.

It appears that, in general, the oxygen penetrates into the metal phase and oxidizes it first, leaving the intermetallic phase $M_5Si_3$ virtually unaffected. It appears that the interfaces and also the grain boundaries assist the diffusion of oxygen.

Another problem is that, at low temperature, typically between 500 and 900° C., this type of material is incapable of rapidly developing a layer of protective oxides owing to a very low diffusion kinetics. As a result, the oxygen rapidly penetrates to the heart of the material, which makes it brittle. This type of oxidation is called the plague effect.

The main solutions which have been developed for protecting these materials of type Nb—Si are methods of diffusion coating by pack cementation, coatings obtained by siliconization, chromatization or aluminization or a combination of several such solutions.

According to Guo, X. P., Zhao, L. X., Guan, P., Kusabiraki, K. 2007 *Materials Science Forum* 561-565 (PART 1), pp. 371-374, it is possible to protect this type of material with a silicon-based coating deposited by pack cementation but with a halogenated activator. Xiaoxia Li and Chingen Zhou, 2007 *Materials Science Forum* 546-549 (PART 3), pp. 1721-1724 have applied siliconization by pack cementation activated by a halogenated activator to niobium silicide alloy coated with an MCrAlY deposited by plasma projection in air, the coating obtained by siliconization alone not being sufficiently protective.

Chen Chen et al. in Intermetallics, 15 (2007) 805-809 also propose protecting a material of type Nb—Si with a coating of silicon also comprising chromium. The chromium is deposited by pack cementation starting from chromium powder and a halogenated activator. The silicon is deposited either by pack cementation starting from silicon powders and a halogenated activator, or by molten salts.

Still starting from methods of pack cementation with a halogenated activator, Tian et al. propose a coating based on silicon and comprising either aluminium (Surface and Coating Technology, 203 (2009) 1161-1166) or yttrium (Surface and Coating Technology, 204 (2009) 313-318).

The major problem of all these techniques published in the literature within the public domain is that they use halogenated activators which, with the components of the niobium silicides, form highly reactive halogenated gases, which locally degrades the microstructure. It is therefore necessary to develop a technique which enables a coating to be created by diffusion without using halogenated gas.

Publication FR 2965568 describes a method for forming a protective coating against high-temperature oxidation on a surface of a refractory composite material based on silicon and niobium, wherein a non-halogenated gas comprising silicon and oxygen is reacted with chromium present on the surface to be protected in order to produce a composite coating having two phases, of which a first phase is an oxide phase based on silicon and having viscoplastic properties and a second phase is based on silicon, chromium and oxygen, and wherein said first and second phases are coalesced at high temperature, which allows a protective coating to be formed in which the second phase acts as a reservoir to reform, during operation, the first phase by reaction with an oxidizing gas.

The disadvantage of these types of method, whether the reactive gas is halogenated or not, is the necessity of using energy, these treatments being carried out in a furnace at high temperature. Another disadvantage for coatings based on silicon and chromium is their sensitivity to water vapour. As regards the NiAl coating obtained by the above-mentioned techniques, owing to the difference between the coefficients of expansion of the β-NiAl ($15 \times 10^{-6}$ $K^{-1}$) and the material of type Nb—Si ($10 \times 10^{-6}$ $K^{-1}$), the coating cracks in use.

In another field it has been verified that, owing to the strong chemical disparity, it is impossible to obtain by the current techniques of diffusion coating (pack cementation or chemical vapour deposition) a homogeneous coating of nickel aluminide on an assembly of materials, whether those materials, homogeneous or heterogeneous, are brazed, welded or simply screwed or riveted. By way of example, it is impossible, at present, to coat with a β-NiAl the assembly of a niobium-silicon alloy and a nickel-based superalloy, whatever the assembly technique used, least of all in a single operation. The other techniques of depositing an NiAl alloy, such as triode cathode sputtering (TCS) or physical vapour deposition (PVD), are directional and not suitable for complex shapes. Finally, chemical vapour deposition (CVD)

permits only low deposition rates (approximately one micrometre per hour), which are not compatible with industrial production.

In addition, it is known that the reaction of synthesis of an NiAl material starting from Ni powder and Al powder is well known.

Accordingly, in the article "Review: reaction synthesis processing of Ni—Al intermetallic materials", Materials Science and Engineering A 299 (2001) 1-15, K. Morsi mentions principally two methods which are carried out starting from nickel and aluminium powders. One of the methods, called "Self-propagating High temperature Synthesis" (abbreviated to SHS), carries out a self-propagating synthesis at high temperature. The other method employs a thermal blast or simultaneous combustion and can be described as a combustion method.

The articles of U. Anselmi-Tamburini and Z. A. Munir (The propagation of a solid-state combustion wave in Ni—Al foils in J. Appl. Phys., 1989, vol. 66, pp. 5039-45), of D. E. Alman, J. C. Rawers and J. A. Hawk (Microstructural and Failure Characteristics of Metal-Intermetallic Layered Sheet Composites in Metallurgical and Materials Transactions A, vol. 25A, 1995, 589ff) and of Ping Zhu, J. C. M. Li and C. T. Liu (Combustion reaction in multilayer nickel and aluminium foils, in Material Science and Engineering, A 239-240, 1997, 532-539) teach that it is also possible to synthesize intermetallic compounds, including Ni—Al, with alternate sheets of nickel and aluminium.

Publication FR 2752540 describes a method for applying an NiAl coating which is applied specifically to nickel- or cobalt-based superalloys. It is a method of the SHS type using compacted powders with application to the part (powders+alloy mixture) of a temperature gradient (200° C.), of a high pressure (hydrostatic pressure of the furnace up to 1.5 GPa) and a temperature of 1200° C.

Publication FR 2838753 describes an analogous method but for building up superalloys based on nickel or cobalt.

Another application of a coating, here NiAlPt, is described, still for nickel-based superalloys, by M. C. Record, H. de Jouvancourt and R. M. Marin-Ayral (Elaboration of Platinum-Modified NiAl Coatings by Combustion Synthesis: Simultaneous Repairing and Coating of Ni-based Superalloys, in International Journal of Self-Propagating High-Temperature Synthesis, 2007, Vol. 16, No. 4, pp. 199-206). This article relates to an SHS process with a brazing sheet introduced between the nickel-based superalloy and the compacted nickel-aluminium-platinum powder mixture, the whole being placed in a furnace with a temperature gradient and under high pressure.

All these techniques require a temperature gradient on the part and high pressures, which are not easy to employ especially for objects with thin walls which may be deformed under the effect of the pressure.

Publication US 2003/0211239 describes a method of aluminization by diffusion and teaches more particularly that, in order to make an NiAl coating, it is necessary to produce a composite electrolytic deposition comprising powders, one of which is optionally aluminium powder. This deposition must be baked above 871.11° C. (1600° F.), that is to say at a temperature higher than the melting point of pure aluminium. In the case where the quantity of aluminium is not sufficient, the remainder is supplied by a method of aluminization by diffusion.

Publication WO 2009/139833 describes a method for producing a barrier layer of aluminide, wherein the barrier layer comprises a nickel aluminide, an iron aluminide or a combination thereof, and the barrier layer is produced by a diffusion coating method on at least one surface of the article. It is, therefore, an aluminization method carried out at temperatures far higher than the melting point of pure aluminium, for example from 800° C. to 1200° C. and from 900° C. to 1100° C. The method also provides applying an aluminium foil to the surface of the substrate, and that annealing takes place at between 700 and 1200° C., therefore far above the melting temperature of aluminium. It is, therefore, a technique by reaction with liquid aluminium.

BRIEF SUMMARY OF THE INVENTION

The object of the invention is especially to overcome the disadvantages mentioned above.

It aims especially to provide a method for producing a nickel aluminide coating on a metal substrate, in particular of a material of type Nb—Si, without using halogenated gas, without using high pressures and at low temperature.

To that end, the invention proposes a method of the type defined above which comprises the following steps:
a) coating the substrate with a deposition of nickel;
b) applying an aluminium foil to the deposition of nickel of step a) in order to form an assembly constituted by the substrate coated with the deposition of nickel and the aluminium foil; and
c) subjecting the assembly to heat treatment at a temperature below the melting temperature of aluminium, that is to say below 660.30° C., and under reduced pressure in order to cause a reaction between the aluminium and the nickel and thus form a layer of nickel aluminide β-NiAl on top of a layer of nickel.

BRIEF DESCRIPTION OF THE SEVERAL VIEWS OF THE DRAWINGS

The invention will now be described, by way of example, with reference to the accompanying drawings, in which.

DETAILED DESCRIPTION OF THE INVENTION

The method of the invention thus makes it possible to create on the metal substrate to be coated a multilayer coating with adapted coefficients of expansion based on nickel aluminide and nickel alloy, without using halogenated gas and at low temperature.

It also offers the advantage that it does not use high pressure but, on the contrary, a reduced pressure, so that there is no need for a specific mounting for the substrate or for the part formed from the substrate.

The method does not require a brazing sheet between the metal substrate to be protected and the first layer of nickel. Nor is it necessary to apply a temperature gradient to the substrate or to the part.

Furthermore, the method of the invention is applicable mainly to composite base materials of type Nb—Si, which do not comprise nickel, but it may be extended to other alloys such as iron-based alloys including steels (that is to say iron-based alloys the carbon content of which is between 0.008% and 2.14% by mass), which may be alloyed or treated, nickel-based alloys (refractory alloys and superalloys), cobalt-based alloys (refractory alloys and superalloys), titanium-based alloys, and some intermetallics such as titanium aluminides TiAl.

In addition, this method allows the coating to be repaired locally either after manufacture in the case of peeling following an error in the handling of a part, or after ageing during operation.

The expression "deposition of nickel" is here to denote a deposition based on nickel, that is to say either a deposition of pure nickel or a deposition of a nickel alloy.

The metal substrate (material of type Nb—Si or other metal material) is thus coated with a deposition of nickel or of an alloy comprising nickel. Such a nickel alloy may comprise at least one element chosen from W, Ce, Cr, Pt, Pd, Y, Hf and Zr, this list not being limiting.

The invention accordingly covers both a deposition of pure nickel and co-depositions, for example of Ni—W, Ni—Re, Ni—Cr, Ni—Pd, Ni—Pt, Ni—Zr.

Accordingly, step a) can comprise a deposition of nickel followed by a deposition of a nickel alloy, in particular of a nickel-palladium alloy.

In a variant, step a) can be preceded by a prior step of depositing a layer of a metal other than nickel, in particular of chromium.

Such co-depositions have the advantage that it is possible to achieve better oxidation resistance as compared with a simple NiAl coating obtained starting from a deposition of pure nickel and an aluminium foil. Furthermore, a deposition of Ni—W, in addition to the NiAl coating, allows a diffusion barrier to be created and the NiAl to be stabilized.

These depositions can be carried out by a wet method (electrolytic method or chemical method) or by a dry method, for example by triode cathode sputtering (TCS), by physical vapour deposition (PVD), by chemical vapour deposition (CVD), or by any other method known to the person skilled in the art.

Step a) can be followed directly by step b) of applying the aluminium foil.

It is, however, advantageous to follow step a) with an intermediate step of annealing the deposition of nickel, which causes the nickel to diffuse within the substrate and increases the bonding of the nickel to the substrate.

Preferably, step b) comprises applying one or more pure aluminium foils to the substrate coated with the deposition of nickel and deforming the aluminium foil or foils to match the shape of the substrate. The flexibility of the foil is such that it is possible, simply by bending, to cover an entire part with one or more layers of aluminium, which allows the quantity of aluminium introduced into the coating to be managed.

The assembly so obtained is then subjected to the heat treatment of step c) at a temperature below the melting temperature of aluminium (660.3° C.). This temperature is chosen in order to be able to initiate the NiAl formation reaction without the aluminium melting or running. Accordingly, the method can be applied to any parts of any shape without a tool or particular inclination of the part. Accordingly, in the case of a part having hollow regions, there will not be an overconcentration of aluminium as a result of its melting and running into the hollow regions.

In practice, it is preferred to carry out the heat treatment of step c) at a temperature of between 550° C. and 655° C. Below 550° C., there are risks of forming an NiAl that is more porous than that produced at a higher temperature. The heat treatment is preferably carried out at a temperature of 650° C. for at least 1 hour, preferably for 5 hours, and under a vacuum better than $10^{-4}$ Pa. In general, the temperature is raised by 10 K/minute to 650° C. and then heat treatment is carried out at that temperature for a duration of 5 hours. As will be seen hereinbelow, the duration of the heat treatment can be shorter.

All the aluminium deposited in the form of a foil reacts with the nickel previously deposited to form the β-NiAl compound. If the quantity of nickel, expressed as the number of atoms, previously deposited is greater than the quantity of aluminium, again expressed as the number of atoms, there is obtained a bi-layer constituted on the one hand by β-NiAl on top of a layer of pure nickel on the other hand. The residual thickness of the latter can therefore be adjusted according to the quantity of aluminium used and the thickness of the desired protective coating. Zones with variable proportions between the thickness of the Ni layer and the thickness of the β-NiAl layer can thus be obtained on one and the same part by successive bending.

Step c) of heat treatment can be followed by a step d) of annealing in vacuo or under a controlled atmosphere, preferably under argon, and at a temperature of between 800 and 1200° C. This allows a β-NiAl layer close to stoichiometry to be obtained and the adaptation layer of pure nickel to be managed.

The metal substrate is formed of at least one material chosen from materials of type Nb—Si, iron-based alloys including steels (that is to say iron-based alloys the carbon content of which is between 0.008% and 2.14% by mass), which may be alloyed or treated, nickel-based alloys (refractory alloys and superalloys), cobalt-based alloys (refractory alloys and superalloys), titanium-based alloys, and some intermetallics such as titanium aluminides TiAl. This list is not limiting.

The method of the invention offers different application possibilities.

The nickel aluminide coating can be applied to a new part formed from the substrate. It can also be applied to an existing coating of a part in order to make a local repair to the existing coating.

The part can be formed of a single material or of an assembly of two materials.

When the method is used for the local repair of an existing coating, step a) advantageously comprises a deposition of nickel by retouching with nickel by pad electrolysis, and step b) advantageously comprises applying a small aluminium foil to the nickel retouching.

According to another aspect, the invention relates to a part comprising a metal substrate provided with a nickel aluminide coating as obtained by carrying out the method as defined above.

The invention will be described in greater detail in the following examples.

Example 1

It is proposed to construct a protective coating on a refractory alloy based on niobium and silicon called material of type Nb—Si.

To that end, after wet sanding with alumina of grain size 320 mesh (40 μm) under a pressure of 5 bar, the substrate is first coated by an electrolytic deposition of nickel according to a technique known to the person skilled in the art:

| Nickel sulfamate | $Ni(SO_3NH_2)_2$ | 350 g/l |
| Nickel chloride | $NiCl_2, 6H_2O$ | 3.5 g/l |
| Boric acid | $H_3BO_3$ | 40 g/l |
| Temperature | 45° C. | |
| Current density | $2 \leq J \leq 5$ A/dm² (3 A/dm²) | |

There is thus deposited a nickel coating having a thickness of 45 μm.

During a second step, the nickel-plated material of type Nb—Si is covered with a commercial aluminium foil having a thickness of 17 μm. This step will be called "application of an aluminium foil" and the operation as a whole will be called "aluminium coating".

The assembly (nickel-plated material of type Nb—Si and aluminium foil) is introduced into a furnace under a vacuum better than $10^{-4}$ Pa. Annealing is carried out therein at 650° C. for 5 hours, which is less than the melting temperature of aluminium.

After heat treatment, it is observed that the aluminium has reacted completely and that there has been no loss of aluminium ($M_{before}$ heat treatment=$M_{after}$ heat treatment).

Examination of a metallographic section, performed on a sample according to the example, by scanning electron microscopy shows that formation of an uncracked β-NiAl layer has taken place. Its thickness is about 85 μm and its coefficient of expansion is $15.5 \times 10^{-6}$ K$^{-1}$. This layer is on top of a residual layer of nickel having a thickness of about 25 μm and a coefficient of expansion of $13 \times 10^{-6}$ K$^{-1}$. The assembly completely covers the substrate of niobium-silicon alloy, the coefficient of expansion of which is $10 \times 10^{-6}$ K$^{-1}$.

It is to be noted that this treatment may be followed by annealing called homogenization annealing. To that end, it is sufficient to anneal the coating obtained in vacuo, or preferably under argon, for a period of time that is in relation to the quantity of residual aluminium desired. The temperature of the annealing is between 800 and 1200° C., preferably 1050° C. In this manner there is obtained a coating of β-NiAl close to stoichiometry, or even slightly sub-stoichiometric. In addition, this annealing allows the final thickness of the adaptation layer of pure nickel to be managed.

Example 2

The procedure of Example 1 is followed, except that an intermediate step of nickel annealing is added after the electrolytic deposition.

The nickel is diffused for 1 hour at 1100° C., which allows the bonding of the nickel to the material of type Nb—Si to be increased.

After application of an aluminium foil and heat treatment identical to that of Example 1 (T=650° C., P=$10^{-4}$ Pa, t=5 hours), there is obtained a layer of β-NiAl on top of a residual layer of Ni which adheres strongly to its substrate and acts as a coefficient of expansion adapter.

Example 3

A refractory alloy based on niobium and silicon called material of type Nb—Si as in Example 1 is used, except that the nickel coating having a thickness of 45 μm is deposited by triode cathode sputtering from a nickel target, the sheet of aluminium foil being 17 μm.

Results identical to those of Example 1 are obtained.

Example 4

It is proposed to construct a protective coating on a refractory alloy based on niobium and silicon.

To that end, the substrate is first coated by an electrolytic deposition of nickel-tungsten starting from one of the baths having the following compositions:

Formulation based on nickel sulfate:
Nickel sulfate heptahydrate: $NiSO_4$, 7 $H_2O$ (20 g/l)
Sodium tungstate dihydrate: $NaWO_4$, 2 $H_2O$ (100 g/l)
Citric acid monohydrate: $C_6H_8O_7$, $H_2O$ (66 g/l)
Ammonia: $NH_4OH$ (in a quantity sufficient to adjust the pH of the electrolytic bath to 7.5)

Formulation based on nickel chloride:
Nickel chloride hexahydrate: $NiCl_2$, 6 $H_2O$ (20 g/l)
Sodium tungstate dihydrate: $NaWO_4$, 2 $H_2O$ (100 g/l)
Citric acid monohydrate: $C_6H_8O_7$, $H_2O$ (66 g/l)
Ammonia: $NH_4OH$ (in a quantity sufficient to adjust the pH of the electrolytic bath to 7.5)

The temperature of the bath is 70° C., the current density applied (between 7 and 15 A/dm²) allows a tungsten concentration of between 46 and 49% by mass to be obtained in the co-deposition.

The deposition obtained is then heat treated under a vacuum better than $10^{-4}$ Pa in order to precipitate the phases of a diffusion barrier. According to the temperature of the intended final application, the duration of the annealing will be between 1 and 16 hours, either at a temperature of 1100° C. in order to precipitate the pure tungsten phase, or at a temperature of 900° C. in order to precipitate the intermetallic phase $Ni_4W$. These diffusion barrier phases then form an integral part of the substrate.

After application of an aluminium foil and annealing at 650° C. for 5 hours under a vacuum better than $10^{-4}$ Pa there is obtained a layer of superstoichiometric β-NiAl ($Ni_{40}Al_{60}$), the oxidation resistance of which is known. The coating so obtained is composed of three successive layers from the outside to the inside: a layer of β-NiAl having a coefficient of expansion of $15.5 \times 10^{-6}$ K$^{-1}$, then a layer of virtually pure nickel having a coefficient of expansion of $13 \times 10^{-6}$ K$^{-1}$, and finally the substrate, the superficial layer of which is enriched with tungsten precipitates, the coefficients of expansion of which are $4.5 \times 10^{-6}$ K$^{-1}$. It will be noted that the substrate employed here, an alloy of type NbSi, has a coefficient of expansion of $10 \times 10^{-6}$ K$^{-1}$. All these properties (good oxidation resistance of the β-NiAl, diffusion barrier effect of the layer enriched with tungsten, adaptation of the coefficients of expansion of the different layers) mean that there is ultimately obtained an adherent coating which is adapted perfectly to the niobium-silicon substrate.

Example 5

It is proposed to construct a protective coating on a refractory alloy based on niobium and silicon called material of type Nb—Si. The aim here is to obtain a coating of nickel aluminide modified by palladium.

To that end, the substrate is first coated by an electrolytic deposition of nickel of about thirty micrometres as in Example 1. This deposition is followed by a second electrolytic deposition of palladium-nickel alloy, this time starting from the bath having the following composition:

| | | |
|---|---|---|
| Tetraamine palladium chloride | Pd(NH$_4$)$_4$Cl$_2$ | 24 gl$^{-1}$ 0.09M |
| Nickel chloride hexahydrate | NiCl$_2$, 6H$_2$O | 40 gl$^{-1}$ 0.17M |
| Ammonium chloride | NH$_4$Cl | 100 gl$^{-1}$ 1.87M |
| Ammonia | NH$_4$OH | q.s. pH = 8.0 |
| Deposition temperature | 25° C. | |
| Current density | 3 A/dm$^{-2}$ | |

The coating obtained may optionally be annealed under a vacuum better than 10$^{-4}$ Pa.

The step of application of aluminium is then carried out. The assembly is then annealed at 650° C. for 5 hours. There is thus obtained a layer of (Ni,Pd)Al which is highly superstoichiometric in terms of aluminium and the oxidation resistance of which at high temperature is known. It is remarkable to note that there remains between the substrate and the coating of nickel aluminide modified by palladium a layer of virtually pure nickel which acts as an adapter of stresses of thermomechanical origin.

Example 6

A substrate of a material based on niobium and silicon is used. The substrate is first coated by an electrolytic deposition of chromium starting from the following conventional bath:

| | | |
|---|---|---|
| Chromium trioxide | CrO$_3$ | 250 g/l |
| Sulfuric acid | H$_2$SO$_4$ | 2.5 g/l |
| Temperature | 40° C. | |
| Current density | 50 A/dm$^2$ | |

Under these conditions, as is known to the person skilled in the art, a deposition of pure chromium having a thickness of about 25 μm is obtained in 55 minutes. Within the scope of this invention, a layer of between 10 and 30 μm is deposited, the preferred thickness being 20 μm.

Following this operation, the assembly substrate+chromium deposition is nickel-plated as in Example 1.

The step of application of aluminium is then carried out, followed by heat treatment thereof at 650° C. for 5 hours. There is obtained a layer of β-NiAl, the oxidation resistance of which is known, resting on a layer of Ni enriched with chromium.

It is possible to follow the production of this coating by an optional heat treatment of 7 hours at 1100° C. either in vacuo or under argon. At the end of this treatment, the chemical composition of the β-NiAl coating is close to stoichiometry. The excess aluminium is absorbed by the layer of pure nickel, which then becomes beta and gamma prime (Ni$_3$Al). Since the latter phase is able to solubilize a large amount of chromium, continuity between the protective coating and the substrate is ensured.

Example 7

Namely a part protected according to Example 1.

After production of the coating, a poorly coated zone is observed (case of a drilled part or a part having a very particular shape).

The zone is repaired locally by retouching by pad electrolysis of a nickel solution. This retouching operation is carried out according to the process of selective electrolysis without immersion known by the name DALIC® process. This retouching operation is followed by the application of a patch of aluminium in the form of a small foil which is applied by the aluminium application technique described hereinbefore. Annealing is carried out under a vacuum better than 10$^{-4}$ Pa at a temperature of 650° C. for 5 hours. At the end of this operation, the zone is repaired and no longer exhibits any discontinuity.

Example 8

Namely a part protected according to Example 1.

After production of the coating and after service, peeling of the β-NiAl coating is observed. In service, the peeling is visible because the underlying nickel immediately forms green oxide.

Local deoxidation is then carried out according to methods known to the person skilled in the art, for example in a deoxidation bath. This operation is followed by retouching by pad electrolysis of a nickel solution, as described in Example 7. The deposition is then covered with a patch of aluminium in the form of a small foil applied by the aluminium application technique described hereinbefore. Annealing is carried out under a vacuum better than 10$^{-4}$ Pa at a temperature of 650° C. for 5 hours. At the end of this operation, the zone is repaired and no longer exhibits any discontinuity.

Example 9

It is proposed to coat a nickel-based superalloy, IN738, also called Inconel®738. The assembly, IN738 which has not been subjected to the prior deposition of nickel and its aluminium covering, is brought to 650° C. under a vacuum better than 10$^{-4}$ Pa at 650° C. for 5 hours. At the end of this test, the deposition reaction has not taken place, that is to say the IN738 substrate is still wrapped in an aluminium foil which has not melted.

The experiment is repeated, but the sample of IN738 is covered with an electrolytic nickel layer of about 22 μm as in Example 1. The nickel-plated IN738 is then placed in tinfoil. After heat treatment for 5 hours under a vacuum better than 10$^{-4}$ Pa at 650° C., the sample is coated with a layer having a thickness of about 35 μm of β-NiAl superstoichiometric in terms of aluminium of composition Ni$_{40}$Al$_{60}$. This layer is separated from the substrate by a residual layer of pure nickel having a thickness of about 15 μm. Closer examination of the microstructure shows that this coating technique has not heated the core of the material (no dissolution of the γ' phase in the γ matrix of the superalloy). This finding is corroborated by the poor interdiffusion between the nickel underlayer and the IN738 substrate.

In the same manner as in Examples 5 or 6, this coating may be modified by palladium, platinum and/or chromium.

Example 10

The procedure of Example 9 is followed, except that the deposition of nickel is a deposition of composite chemical nickel Ni+NiZr according to the technique described in French patent no. 2 807 073 (U.S. Pat. No. 7,160,582). At the end of the deposition, the superalloy is coated with a layer of about 20 μm of nickel containing an included fraction by mass of 15% of the intermetallic NiZr. The assembly is subsequently covered with an aluminium foil as in the preceding examples (T=650° C., P=10$^{-4}$ Pa, t=5 hours). At the end of this operation there is obtained a coating of β-NiAl superstoichiometric in terms of aluminium of composition Ni$_{40}$Al$_{60}$ having a thickness of about 35 μm on top of a residual layer of composite nickel having a thickness of about 15 µm. The small temperature rise of the substrate has allowed the microstructure of the composite deposition to be kept intact. By virtue of appropriate diffusion annealing, in vacuo or, preferably, under argon, it is subsequently possible on the one hand to reduce the aluminium content of the coating (in order to obtain a composition close to stoichiometry) and on the other hand to promote controlled interdiffusion between the included NiZr particles and the entirety of the coating, which allows the β-NiAl to be enriched in the reactive element, here zirconium.

It is to be noted that it would have been possible to carry out this operation with a co-deposition comprising hafnium, yttrium, cerium or any other reactive element whose properties of strengthening the adhesion of the layer of alumina formed thermally under oxygen on the surface of nickel aluminide coatings are known to the person skilled in the art.

Example 11

It is proposed to coat an assembly of a material of type Nb—Si and CMSX-4®, that is to say a material based on niobium-silicon with a material based on nickel. After assembly of the two materials (by brazing, welding, riveting, etc.), the assembly is coated with an electrolytic nickel layer having a thickness of about 40 µm, as described in Example 1. The nickel-plated assembly is then coated with an aluminium foil, again as in Example 1. After heat treatment for 5 hours under a vacuum better than $10^{-4}$ Pa at 650° C., the assembly material of type Nb-Si+CMSX-4 is coated with a homogeneous layer having a thickness of about 35 µm of β-NiAl superstoichiometric in terms of aluminium of composition $Ni_{40}Al_{60}$ on top of an underlayer of pure nickel of about 15 µm.

This technique is the only technique that allows a coating of β-NiAl, modified or unmodified, to be created without a "material effect" due to interdiffusion during production of the coating being noted.

Example 12

The procedure of Example 1 is followed, but there are used an assembly composed of a nickel-based alloy called Nimonic75 (nickel-based alloy comprising 20% by weight chromium) brazed to a titanium aluminide gamma TiAl (composition Ti-46.5Al-4(Cr,Nb,Ta,B)) according to the technique described in French patent no. 2 857 892 (U.S. Pat. No. 7,749,614), a deposited coating of 37 µm of nickel and a sheet of aluminium foil of 25 µm.

After heat treatment for 5 hours under a vacuum better than $10^{-4}$ Pa at 650° C., the assembly material of type Nb-Si+N75 is coated with a homogeneous layer having a thickness of about 70 µm of β-NiAl superstoichiometric in terms of aluminium of composition $Ni_{40}Al_{60}$ on top of an underlayer of pure nickel of about 20 µm.

Example 13

The procedure is carried out using a refractory alloy based on niobium and silicon called material of type Nb—Si as in Example 1, except that the nickel coating is 17 µm thick, the sheet of aluminium foil being 22.7 µm, and that, voluntarily, one face is surmounted by an aluminium layer without contact with the deposition of nickel.

Whatever the state of contact of the aluminium foil, the results on the two faces are similar.

These results show that it is not necessary to have perfect contact between the aluminium foil and the deposition of nickel.

Example 14

The procedure of Example 1 is followed, but there are used an alloy called 35NCD16 (low alloy steel) and a deposited coating of 30 µm of nickel and a sheet of aluminium foil having a thickness of 19.8 µm.

As in the case of the refractory alloy based on niobium and silicon, an identical morphology of the deposition is observed, namely:
  a zone in which the reaction has taken place to form an almost stoichiometric β-NiAl (58/42) over a thickness of about 30 µm, and
  a zone in which the nickel is found over about 20 µm.

Example 15

The procedure of Example 1 is followed, but there are used an alloy called 18/10 stainless steel, a deposited coating of 25 µm of nickel and a sheet of aluminium foil of 25 µm. As in the case of the refractory alloy based on niobium and silicon, an identical morphology of the deposition is observed, namely:
  a zone in which the reaction has taken place to form an almost stoichiometric β-NiAl (58/42) over a thickness of about 30 µm, and
  a zone in which the nickel is found over a thickness of about 16 µm.

Example 16

The procedure of Example 1 is followed, but there are used a titanium alloy called TA6V (Ti-6Al-4V), a deposited coating of 47 µm of nickel and a sheet of aluminium foil of 27 µm.

As in the case of the refractory alloy based on niobium and silicon, an identical morphology of the deposition is observed, namely:
  a zone in which the reaction has taken place to form an almost stoichiometric β-NiAl (58/42) over a thickness of about 53 µm, and
  a zone in which the nickel is found over a thickness of about 11 µm.

Example 17

The procedure of Example 1 is followed, but there are used a titanium aluminide gamma TiAl of composition Ti48Al2Cr2Nb, a deposited coating of 32 µm of nickel and a sheet of aluminium foil of 23 µm.

As in the case of the refractory alloy based on niobium and silicon, an identical morphology of the deposition is observed, namely:
  a zone in which the reaction has taken place to form an almost stoichiometric β-NiAl (58/42) over a thickness of about 40 µm and
  a zone in which the nickel is found over a thickness of about 20 µm.

Example 18a

This example as well as Examples 18b, 19a and 19b are intended to show that the minimum duration of the heat treatment necessary in order that the NiAl formation reaction is complete must be adapted according to the material.

The procedure of Example 1 is followed, but there are used a deposited coating of 30 μm of nickel and a sheet of aluminium foil of 17 μm, and the assembly (nickel-plated material of type Nb—Si and aluminium foil) is introduced into a furnace under a vacuum better than $10^{-4}$ Pa. Annealing is carried out therein at 650° C., which is less than the melting temperature of aluminium, for 30 minutes (and not five hours).

From the surface to the substrate, which will become the uncracked β-NiAl layer after five hours, there are found under a scanning electron microscope, in the form of two successive layers:
- a first non-homogeneous layer constituted by zones of unreacted aluminium and zones of NiAl (40/60 at.) having a thickness of about 15 μm. In this layer, the reaction is not complete,
- and a nickel-rich layer with, on the first microns of this layer, interdiffusion of the aluminium into the nickel. This nickel layer measures approximately between 25 and 28 μm in thickness. This means that a very small quantity of nickel is consumed during the reaction to convert the nickel and the aluminium into nickel aluminide.

The duration of 30 minutes is not sufficient, for this example, to obtain the two layers of β-NiAl and nickel resting on the substrate.

Example 18b

The procedure of Example 1 is followed, but the assembly (material of type Nb—Si plated with nickel and coated with aluminium) is introduced into a furnace under a vacuum better than $10^{-4}$ Pa. Annealing is carried out therein at 650° C., which is less than the melting temperature of aluminium, for one hour (and not five hours). On the surface, and as seen under a scanning electron microscope, it is possible to distinguish a morphology of three types:
- a first in the form of needles which, according to analysis (EDS), are rich in aluminium (75% at) and in nickel (25% at), namely an aluminium phase enriched with nickel. In this zone, the reaction is not complete,
- a second zone which is rich in aluminium (60% at) and in nickel (40% at), namely a superstoichiometric NiAl, and illustrates a zone which has reacted completely, and
- finally an intermediate zone which is a zone with nickel (50% at) and aluminium (40% at), namely a stoichiometric NiAl.

Unlike Example 18a (heat treatment for 30 minutes), pure unreacted aluminium is not observed on the surface, but the reaction to form superstoichiometric NiAl is not complete as in the case of Example 1 (heat treatment for 5 hours).

The duration of one hour is not sufficient, for this example, to obtain the two layers of β-NiAl and nickel resting on the substrate.

Example 19a

The procedure of Example 1 is followed, but there are used a deposited coating of 14 μm of nickel, a sheet of aluminium foil of 17 μm and a nickel-based superalloy called MC-NG (monocrystalline nickel-based superalloy as described in FR 2 780 982 and EP 0 971 041 BI). The assembly (MC-NG material plated with nickel and coated with aluminium) is introduced into a furnace under a vacuum better than $10^{-4}$ Pa. Annealing is carried out therein at 650° C., which is less than the melting temperature of aluminium, for 30 minutes (and not five hours).

As in the case of Example 18a (with a material of type Nb—Si and annealing for 30 minutes at 650° C.), there is observed in section, from the surface to the substrate, a two-layer morphology:
- a first non-homogeneous layer constituted by zones of unreacted aluminium Al and zones of NiAl (40/60 at.) having a thickness of about 23 μm,
- a residual nickel layer of 10 μm.

The duration of 30 minutes is not sufficient, for this example, to obtain the two layers of β-NiAl and nickel resting on the substrate.

Example 19b

The procedure of Example 19a is followed, but the assembly (MC-NG material plated with nickel and coated with aluminium) is introduced into a furnace under a vacuum better than $10^{-4}$ Pa. Annealing is carried out therein at 650° C., which is less than the melting temperature of aluminium, for one hour (and not 30 minutes). On the surface, and as seen under a scanning electron microscope, the morphology is homogeneous and has a surface composition corresponding to the formation of a superstoichiometric NiAl as in the case of Example 1. The reaction is therefore complete in this example.

The minimum duration of the heat treatment necessary for the NiAl formation reaction to be complete must therefore be adapted according to the material and more precisely according to its thermal characteristics, the NiAl formation reaction being exothermic.

Example 20

This example describes the principle of application of the aluminium foil. This step comprises depositing a coating comprising nickel, making it diffuse or not, and depositing an aluminium foil, carrying out treatment in vacuo at 650° C. for a duration greater than one hour and variable according to the alloy, a duration of five hours being preferred, in order to obtain a coating based on NiAl, the initial coating based on nickel being converted completely or partially.

Since a coating based on nickel is deposited, it is possible to envisage making co-depositions, such as a deposition of nickel-palladium, nickel-platinum, nickel-zirconium, or a deposition of chromium followed by a deposition of nickel, which will allow better oxidation resistance to be achieved than with a simple NiAl (Examples 5, 6 and 10), a deposition of NiW which, in addition to the NiAl coating, will create a diffusion barrier and stabilize the NiAl (Example 4).

It is clear from the description above, and especially from the examples, that parts comprising a metal substrate provided with a nickel aluminide coating, as obtained by carrying out the method of the invention, have technical characteristics which are different from those of parts obtainable by other methods of the prior art.

As mentioned above, the method of the invention does not create a zone of interdiffusion between the treated alloy and the residual nickel, and there is no rising of elements of the alloy, either in solution or in the form of precipitates in the residual nickel or in the layer of NiAl that is formed, as is the case in conventional aluminizations. The method of the invention makes it possible to obtain an uncracked NiAl coating, unlike the depositions obtained by sputtering of targets, for example triode cathode.

Figure 1:
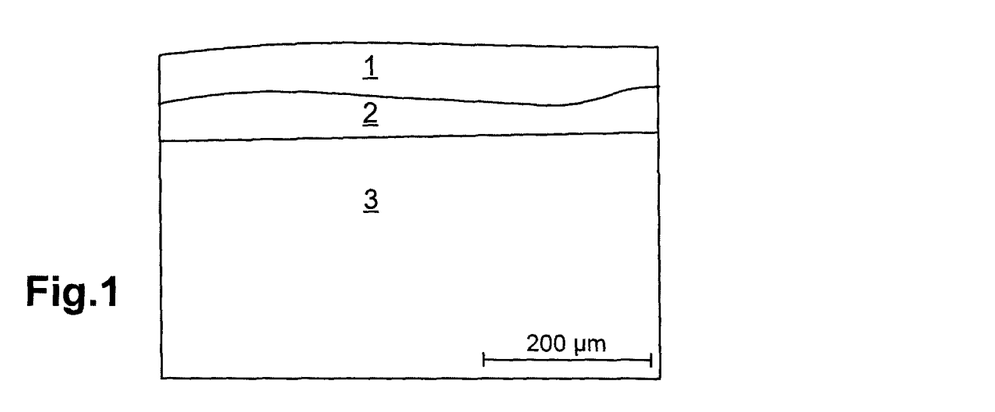
FIG. 1 shows schematically a micrographic section of a coated part as obtained by the method of the invention.
Figure 2:
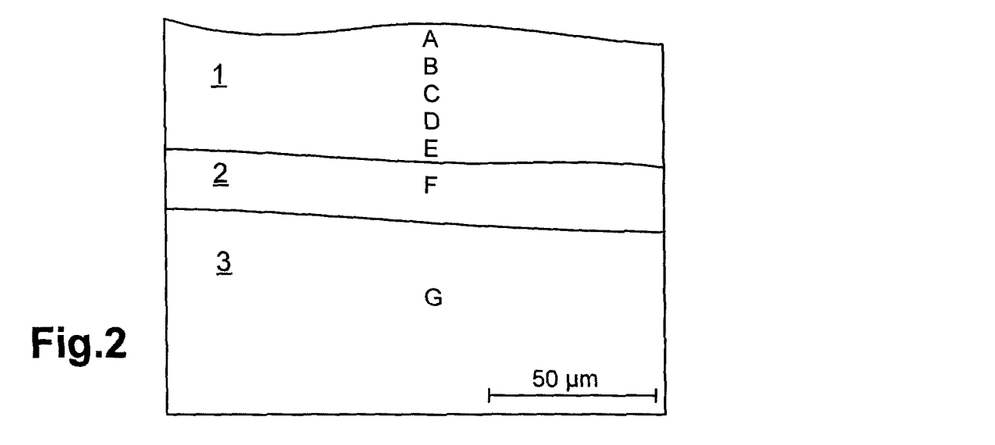
FIG. 2 is a view analogous to FIG. 1 in the case of a material of type Nb—Si protected by the method of the invention.
Figure 3:
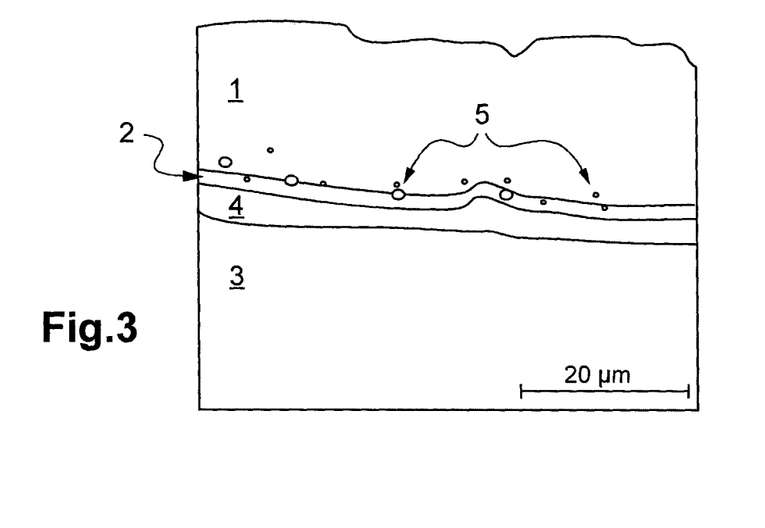
FIG. 3 shows schematically, by way of comparison, a micrographic section of a coated part comprising a material of type Nb—Si (MASC) provided with a deposition of nickel, as obtained by a method of the prior art.
Figure 4:
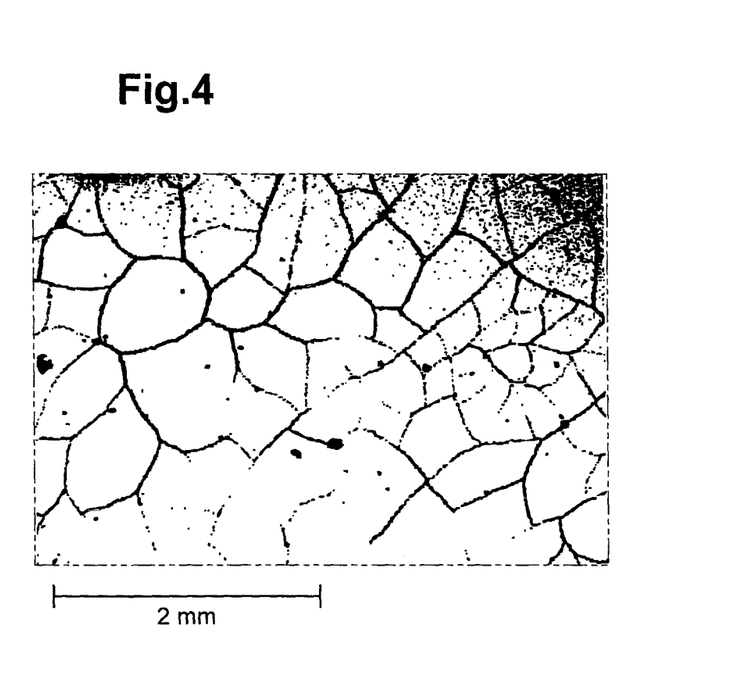
FIG. 4 shows schematically, by way of comparison, a surface microscopy of a part coated with an NiAl layer, as obtained by another method of the prior art.

This will better be understood with reference to the accompanying drawings, in which:

FIG. 1 shows schematically a micrographic section of a coated part as obtained by the method of the invention;

FIG. 2 is a view analogous to FIG. 1 in the case of a material of type Nb—Si protected by the method of the invention;

FIG. 3 shows schematically, by way of comparison, a micrographic section of a coated part comprising a material of type Nb—Si (MASC) provided with a deposition of nickel, as obtained by a method of the prior art; and FIG. 4 shows schematically, by way of comparison, a surface microscopy of a part coated with an NiAl layer, as obtained by another method of the prior art.

FIG. 1 shows a micrographic section of a part coated by the method of the invention. The part is constituted by an uncracked dense outer layer of NiAl 1, an uncracked layer of pure nickel 2 resting on a material 3 to be protected. This structure is found whatever the nature of the material 3 to be protected. In FIG. 1, a scale corresponding to a length of 200 μm is given to show the thicknesses of the layers 1 and 2.

Energy dispersive analyses using a scanning microscope make it possible to confirm that the layers of NiAl and of nickel are pure, as shown by FIG. 2 and Table 1 below.

FIG. 2 is a view analogous to FIG. 1 in the case of a material of type Nb—Si protected by the method of the invention. As in FIG. 1, there is an outer layer of NiAl 1, a layer of nickel 2 resting on the material 3 to be protected, which in the present case is a material of type Nb—Si. A scale corresponding to 50 μm has likewise been shown in FIG. 2.

In FIG. 2, different points A, B, C, D, E, F and G of the layers 1, 2 and 3 have been shown. The atomic percentages of the elements of layers 1, 2 and 3 at points A to G are indicated in Table 1 below.

TABLE 1

|   | A % (Al) (±1) | A % (Ni) (±1) | A % (Nb, Ti, Cr, Hf, Si) Elements of the substrate material |
|---|---|---|---|
| A | 60 (±5) | 40 (±5) | 0 |
| B | 58 (±5) | 42 (±5) | 0 |
| C | 58 (±5) | 42 (±5) | 0 |
| D | 57 (±5) | 43 (±5) | 0 |
| E | 56 (±5) | 44 (±5) | 0 |
| F | 0 | 100 | 0 |
| G | 4 (±2) | 0 | 96 (±2) |

This table shows that layer 1 is composed of average β-NiAl (42/58) and that layer 2 is composed of pure nickel. The composition of layer 3 is that of the substrate material.

By way of comparison, FIGS. 3 and 4 show parts obtained by methods of the prior art. FIG. 3 shows the characteristics of a material of type Nb—Si (MASC) with a deposition of nickel followed by vapour phase aluminization at 1050° C. for 16 hours, according to a conventional method. A scale corresponding to 20 μm has also been shown in FIG. 3.

FIG. 4 shows a surface microscopy of a part coated with a layer of NiAl obtained by a conventional low-temperature method (example by sputtering of a target)—cracking of the underlying layer of NiAl-material:material based on Nb—Si.

These methods for producing such layers achieve characteristics of the parts which are different from those of the invention. Accordingly, with reference to FIG. 3, an interdiffusion layer 4 is found between the layer of nickel 2 and the material 3 to be protected, sometimes with the presence of precipitates 5 close to the layers of NiAl or Ni. This type of facies is obtained when the part is coated by a deposition of nickel and is then aluminized by conventional aluminization methods of the type pack cementation, vapour cementation, slurry cementation, CVD and PVD.

Such facies are described, for example, in the publications of Youlin Li, Wole Soboyejo, Robert A. Rapp, "Oxidation behavior of niobium aluminide intermetallics protected by aluminide and silicide diffusion coatings", Metallurgical and Materials transaction B. volume 30B, June 1999, 495-503 or of A. Katsman, U, A. Ginzburg, T. Werber, I. Cohen, L. Levin, Surface and Coatings Technology 127, 2000, 220-223.

FIG. 4 shows the type of facies obtained when the coated part is obtained by a low-temperature method such as deposition by sputtering of targets (triode cathode, magnetron, etc.). In this case, there is no interdiffusion layer but the layer of NiAl is then cracked, the presence of cracks being visible on the surface by the naked eye, as can be seen from the scale of 2 mm shown in FIG. 4.

As mentioned above, the invention is applicable to different types of metal substrates. The method makes it possible to create a protective coating based on NiAl, it can be applied to the local repair of a coating, even if the coating has been produced by another method (for example aluminization) and for a new coating or an aged coating (after oxidation, corrosion). This is described in Examples 7 and 8.

Finally, the method has the advantage of being able to create a protective coating based on NiAl on an assembly of parts (of different or similar materials), as shown by Examples 11 and 12.

Finally, it is possible to envisage assembling and protecting parts of different or similar materials at the same time.

The invention is applicable especially to the protection of materials used in the turbines of aircraft engines.

The invention claimed is:

1. A method for obtaining a nickel aluminide coating on a metal substrate, comprising Nb—Si, comprising:
    a) coating the substrate with a deposition of nickel;
    b) applying an aluminium foil to the deposition of nickel of step a) in order to form an assembly constituted by the substrate coated with the deposition of nickel and the aluminum foil; and
    c) subjecting the assembly to heat treatment at a temperature of 550° C. to less than 660.3° C. without melting the aluminium foil and under reduced pressure until the aluminium has reacted completely with the nickel in order to form a layer of nickel aluminide β-NiAl on top of a layer of nickel, and wherein the method is free of halogenated gas or halogenated activators; and
    d) annealing in vacuo or under a controlled atmosphere and at a temperature of from 800° C. to 1200° C.

2. The method according to claim 1, wherein step a) comprises a deposition of pure nickel or of a nickel alloy.

3. The method according to claim 2, wherein the nickel alloy comprises at least one element chosen from W, Cr, Cr, Pt, Pd, Hf, Y and Zr.

4. The method according to claim 1, wherein step a) comprises a deposition of nickel followed by a deposition of a nickel alloy.

5. The method according to claim 4, wherein the nickel alloy is a nickel-palladium alloy.

6. The method according to claim 1, wherein step a) is preceded by a prior step of depositing a layer of metal other than nickel.

7. The method according to claim 6, wherein the layer of a metal other than nickel is chromium.

8. The method according to claim 1, wherein the deposition of nickel of step a) is carried out by a wet method.

9. The method according to claim 8, wherein the wet method is an electrolytic or chemical process.

10. The method according to claim 1, wherein the deposition of nickel of step a) is carried out by a dry method.

11. The method according to claim 10, wherein the dry method is triode cathode sputtering (TCS), by physical vapour deposition (PVD) or by chemical vapour deposition (CVD).

12. The method according to claim 1, wherein step a) is followed by an intermediate step of annealing the deposition of nickel, which causes diffusion of the nickel within the substrate.

13. The method according to claim 1, wherein step b) comprises applying an aluminum foil or a plurality of aluminum foils to the substrate coated with deposition of nickel and deforming the aluminum foil or foils to match the shape of the substrate.

14. The method according to claim 1, wherein the heat treatment of step c) is carried out at a temperature of from 550° C. to 655° C., for at least 1 hour, and under a vacuum better than $10^{-4}$ Pa.

15. The method according to claim 14, wherein the heat treatment of step c) is carried out at a temperature of 650° C., for hours, and under a vacuum better than $10^{-4}$ Pa.

16. The method according to claim 1, wherein the nickel aluminide coating is applied to a new part formed from the substrate.

17. The method according to claim 16, wherein the part is formed by an assembly of two materials.

18. The method according to claim 1, wherein the nickel aluminide coating is applied to an existing coating of a part for locally repairing the existing coating.

19. The method according to claim 18, wherein step a) comprises a deposition of nickel by retouching with nickel by pad electrolysis, and step b) comprises applying an aluminum foil to the nickel retouching.

20. The method according to claim 18, wherein the part is formed by an assembly of two materials.

* * * * *